United States Patent Office 3,023,144
Patented Feb. 27, 1962

3,023,144
BIOCIDAL COMPOSITIONS FOR TOPICAL
APPLICATION
Glen A. Greathouse and Aubrey B. Taylor, Orlando, Fla.,
assignors to Mar-Tay, Inc., Orlando, Fla., a corporation of Florida
No Drawing. Filed Aug. 17, 1959, Ser. No. 833,922
2 Claims. (Cl. 167—58)

This invention relates to fungicides, bactericides, and therapeutic compositions for human and animal use. More particularly, the invention relates to novel biocidal compositions for topical application on human beings and anmials, including organic compounds which are cleavage or oxidation products of cyclic terpene hydrocarbons. More specifically, the invention relates to such organic compounds in admixture with citrus oils or with the chief constituents of such oils, in the form of ointments, lotions, creams salves, shampoos, or similar compositions for topical application, and to a method for applying the same.

The present invention also relates to an effective bactericidal compound including in combination p-methylacetophenone salicylic acid, D-limonene and citmonone or foots.

The effective control of infections of the skin and external organs of animals arising from wounds or from infestation by fungi, bacteria, and larvae is a matter of economic importance to farmers and cattleraisers, as well as to owners of household domestic animals. The compositions of the present invention have been found to be highly effective in combating infection due or larvae of the screw-worm, fungal eczemas, and sores, and to exhibit a marked healing action. Similarly, shampoos having superior germicidal properties are in demand in beauty salons.

Cyclic terpene hydrocarbons, particularly monocyclic terpene hydrocarbons, occur naturally in the essential oils of citrus fruits. These essential oils are contained in numerous oils sacs or vesicles which are distributed irregularly in the outer, colored portion of the peel of maturing or mature fruit. From these sacs the oil is obtained upon rupture and separated either by pressing, by solvent extraction, or by distillation.

Citrus oils have been reported to possess some antibacterial and antifungal activity. For example, Bates, Chemical Abstracts, vol. 31, page 7549 (1937), indicated that certain spores of fungi were killed by prolonged immersion in citrus oils, particularly at elevated temperatures, while, on the other hand, certain penicilia were unaffected. Brock and Ketchum, Journal of American College of Chest Physicians, vol. 20, No. 6, page 671 (1951), reported that citrus peel oil showed activity in vitro against certain Mycobacteria and Staphylococci. Citrus peel oil has also been suggested as a deodorant and insect repellant.

The chief constituent of citrus oils is d-limonene, which has been identified in oil of orange, lemon, lime, grapefruit and bergamot, in some of which it occurs to the extent of about 90%. Distillation of the oils yields technical grades of d-limonene of higher purity, some of which may run from 95% to 96%. The d-limonene per se has been found to possess comparatively little germicidal activity. For example, in controlled laboratory tests with various fungi and bacteria, d-limonene at a concentration of about 250 parts per million was found to have virtually no growth-inhibiting effect.

It has been found that organic compounds which are among the cleavage or oxidation products of monocyclic terpene hydrocarbons, such as, for example, d-limonene, possess marked and definite germicidal and fungicidal activity. Compounds of this type include unsaturated hydrocarbon cleavage products, such as, for example, p-cymene. They also include oxygenated derivatives, such as, for example, 8-hydroxy-p-cymene (dimethyltolycarbinal), and p-methylacetophenone.

These bactericidal and fungicidal compounds may be obtained synthetically according to well known chemical procedures. They may also be obtained by chemical treatment of d-limonene itself. Thus, p-cymene may be obtained from waste sulfite liquor, or by catalytic cleavage of d-limonene into p-cymene and p-menthane, followed by vacuum fractionation to separate the p-cymene, according to known procedures. It is a colorless liquid, boiling at 177° C.

The 8-hydroxy-p-cymene may be obtained by oxidation of p-cymene, as an oil, boiling point under 107° C. The p-methylacetophenone is an oil which is available commercially and widely used as a low-priced constituent of perfumes. It can be obtained synthetically or by oxidation of cymene.

At concentrations of about 250 parts per million, it has been found that, in tests involving 11 fungi and 2 bacteria, the following degrees of growth inhibition were shown, respectively, by the above-mentioned compounds:

| | Percent |
|---|---|
| p-Cymene | 5 |
| 8-hydroxy-p-cymene | 40 |
| p-Methylacetophenone | 100 |

The p-cymene, 8-hydroxy-p-cymene, and p-acetophenone have been found to function with heightened effectiveness when used in combination. The relative proportions to be used are determined by the type of application. In some instances, the three compounds may be used in equal parts by weight; in other cases, the p-cymene may predominate. Other combinations of any two of the compounds may also be employed.

It has also been found, according to the present invention, and wholly unexpectedly, that, despite the low biological activity of the d-limonene itself, this substance may act as a solvent and penetrant, and, when used in combination with the above-mentioned derivatives of limonene, it surprisingly brings about an enhanced or synergistic fungicidal and bactericidal action. Thus, mixtures of d-limonene and certain derivatives of d-limonene, such as p-cymene, 8-hydroxy-p-cymene, and p-methylacetophenone, exhibit germicidal and fungicidal activity substantially greater than that of the individual components of the mixture.

In formulating the mixtures of d-limonene and its derivatives into ointments, creams and shampoos, and the like, various other known germicidal agents may be added. These include, for example, salicylic acid, hexachlorophene, copper 8-quionolinate, N-trichloromethyl-thio-tetrahydrophthalimide, and 2,2′-methylene-bis - (3,4,6-trichlorophenol).

The formulations may also include suitable and conventional detergents and emulsifiers, as well as bland oils (white liquid petrolatum), emollients such as zinc stearate, boric acid or talcum, and carriers such as beeswax and petrolatum, polyoxyethylene ethers, and glyceryl monosterate.

It has also been found in accordance with the present invention that the presence of citmonene enables a topical ointment to be prepared containing a relatively high proportion of salicylic acid. Thus, even .25% of salicylic acid in an ointment applied to the skin tends to cause sloughing. When the ointment contains 3 to 30% of citmonone, however, more than 1% of salicylic acid and up to 10% may be used, it is readily soluble in citmonone and no sloughing of the skin occurs. In other words, the salicylic acid is soluble in the citmonone in the ratio of one part salicylic acid to three parts citmonone by weight and the citmonone apparently diminishes the sloughing of skin normally produced by the salicylic acid.

The invention may be illustrated by the following examples, without, however, being limited thereto.

In the preparations of germicidal and fungicidal ointment and cream, the following ranges of concentration of the respective active ingredients have been found effective:

| Ingredients: | Range, percent by weight |
|---|---|
| d-Limonene | 10.0–30 |
| p-Cymene | 0.5–2 |
| p-Methylacetophenone | 0.1–2 |
| 8-hydroxy-p-cymene | 0.2–2 |
| Inert ingredients (carrier) | 89.2–64 |

EXAMPLE 1

A composition of general utility as a germicidal and fungicidal ointment is prepared from the following:

| | Percent by weight |
|---|---|
| d-Limonene | 25 |
| p-Cymene | 0.5 |
| 8-hydroxy-p-cymene | 0.5 |
| p-Methylacetophenone | 1.0 |
| Inert ingredients | 73 |

EXAMPLE 2

Another germicidal and fungicidal composition is prepared as follows:

| | Percent by weight |
|---|---|
| d-Limonene | 25 |
| p-Cymene | 0.5 |
| 8-hydroxy-p-cymene | 0.5 |
| p-Methylacetophenone | 0.5 |
| Salicylic acid | 2.0 |
| Petrolatum | 56.5 |
| Beeswax | 15.0 |

EXAMPLE 3

Another type of germicidal and fungicidal composition corresponds to the following:

| | Percent by weight |
|---|---|
| d-Limonene | 25 |
| p-Cymene | 0.5 |
| 8-hydroxy-p-cymene | 0.5 |
| p-Methylacetophenone | 0.5 |
| Salicylic acid | 0.5 |
| 2,2'-methylene-bis-(3,4,6-trichlorophenol) | 1.0 |
| N-trichloromethyl-thio-tetra-hydrophthalimide | 1.0 |
| Copper 8-quinolinate | 1.0 |
| Emulsifiers and other inert ingredients | 70.0 |

EXAMPLE 4

A shampoo possessing healing and fungicidal properties is formulated as follows:

| | Percent by weight |
|---|---|
| d-Limonene | 5 |
| p-Methylacetophenone | 0.5 |
| Olive oil | 5.0 |
| Detergents | 69.0 |
| Emulsifier | 20.0 |
| N-trichloromethyl-thio-tetra-hydrophthalimide | 0.5 |

The amount of the carriers which may be used in preparing the various compositions will depend upon the purpose to be served. In general, it has been found, for example, that petrolatum can be used in a range of about 50 to 69% by weight, beeswax from about 14 to 20%, polyoxyethylene ethers from about 3 to 15%, and glyceryl monostearate from about 2 to 10%.

When applied to the treatment of infestations and infections, for example to domestic animals, the germicidal and fungicidal ointments of the present invention bring about a marked reduction in healing time as compared with sulfonamide or calamine type ointments. There is also no allergic reaction or irritation. The ointment is safe to animals, which, even if they lick the wounds after application of the ointment, show no clinical evidence of toxicity. In the treatment of eczema lesions in dogs, for example, the infected areas are clipped around the margins to remove hair, if necessary, cleansed with soap and water, and the ointment applied at repeated intervals. The symptoms are generally relieved within 24 hours, and healing is complete in 3 to 5 days. The ointment may be similarly applied to fungus infections of feet of animals and to wounds caused by screw worm infestation. The ointment is also valuable as a healing agent for accidental wounds, lacerations, and scratches, as well as for burns.

EXAMPLE 5

Another example of an especially desirable ointment including the combination of citmonone and salicylic acid is prepared as follows:

*Procedure to obtain concentrated citrus oil (citmonene)*

The citrus rag, seeds and peels are shredded up with water which is recirculated, then lime is added, neutralizing the acid. This mass is mixed and held in spiral mixer for a few minutes to provide thorough mixing and time for the lime to react.

The mix is then fed to continuous conical presses and squeezed till the mass is so dry that no liquid can be squeezed out with the hand. The pulp passes to the feed mill.

The liquid pressed out contains the solubles, sugar, etc. plus the oil. The oil is separated by flash distillation from 240° F. The vapor is condensed and the oil and water separated. This product is known as stripper oil.

The stripper oil is passed through a rock salt filter, removing any remaining moisture. The stripper oil is pumped to a simple still without column and steam distilled by blown steam at 140° F. until the flow of oil stops. The oil is called D-Limonene. The residue is concentrated citrus oil (citmonene or foots).

| Active ingredients: | Percent by weight |
|---|---|
| p-Methylacetophenone | 3 |
| Salicylic acid | 2 |
| d-Limonene | 15 |
| Citmonene (concentrated citrus oil, or foots) | 7 |
| Inactive ingredients: | |
| Petrolatum | 57 |
| Beeswax | 15.5 |
| Odors | 0.5 |

*Procedure to compound*

The petrolatum and beeswax are weighed and placed in stainless steel steam jacketed kettle, heated slowly to 65° C. Then with agitation after carefully weighing, add purified d-limonene, p-methylacetophenone, salicylic acid and citmonene (concentrated citrus oil, or foots). Slowly raise the temperature to 90° C., continue agitation for 5 to 10 minutes to assure thorough mixing. Cool to 65° C., add odors, and package.

It will be seen from the foregoing examples that the biocidal composition of the invention which is adapted in the form of ointments, creams and shampoos for topical use comprises from 5.5 to 36% by weight of active biocidal ingredients, these biocidal ingredients in the case of Example 4 being about 5% by weight of d-limonene and about 0.5% by weight of p-methylacetophenone and being up to 36% by weight of these two ingredients in the ointment shown before Example 1. This ointment before Example 1 is exemplified by the following active ingredients: d-limonene, 10.0–30%; p-cymene, 0.5–2%; p-methylacetophenone, 0.1–2% and 8-hydroxy-p-cymene, 0.2–2% each by weight, this totaling 36% maximum active ingredients with the remainder of the composition being an inert carrier including a member of the group consisting of bland oils, beeswax, petrolatum, polyoxyethylene ethers and glyceryl monostearate and mixtures of these. Also as shown in these examples as an essential part of the biocidal ingredients is the presence of citrus oil foots. In the combination of citrus oil foots, d-limonene and p-methylacetophenone, there is present from 5–30% of d-limonene and from 0.1–3% of p-methylacetophenone and up to 7% of concentrated citrus oil foots each by total weight of the composition, the concentrated citrus oil foots serving to dissolve salicylic acid and there being present from about 0.25% to about 10% of salicylic acid by weight of said composition.

The present application is a continuation-in-part of our application serial No. 603,179, filed August 9, 1956, now abandoned.

It will be understood that the present invention is not limited to the details disclosed, and that changes may be made within the scope of what is claimed without departing from the spirit of the invention.

We claim:

1. A non-irritating biocidal composition effective as a germicide and fungicide for topical use consisting of from about 5.5%–36% by weight of biocidal ingredients and remainder inert carrier selected from the group consisting of bland oils, beeswax, petrolatum, polyoxyethylene ether and glyceryl monostearate, there being present as an essential part of the total about 25% by weight of d-limonene, about 1% based on the total of p-methyl acetophenone, up to about 7% of total weight being concentrated citrus oil foots and from about 0.25% up to about 10% by total weight being salicylic acid, said salicylic acid being soluble in said citrus oil foots, and said citrus oil foots in said composition diminishing the sloughing of skin normally produced by salicylic acid.

2. A non-irritating biocidal composition used as an ointment which consists on a weight basis of about 10% to about 30% of d-limonene, from about 0.5% to about 2.0% of p-cymene, from about 0.1% to about 2.0% of p-methyl acetophenone, from about 0.1% to about 2.0% of 8 hydroxy p-cymene, up to 7% concentrated citrus oil foots, from about 0.25% to about 10% of salicylic acid and an inert carrier consisting of a mixture of petrolatum and beeswax, the citrus oil foots of the composition serving to dissolve said salicylic acid and diminish sloughing of the skin normally produced by salicylic acid.

References Cited in the file of this patent

UNITED STATES PATENTS 2,854,375     Shackell  ---------------- Sept. 30, 1958

OTHER REFERENCES

U.S. Dispensatory, 25th ed., Lippincott Co., Philadelphia, Pa., 1955, pp. 1063–1064, 1776–1778.

D & C, Drug and Cosmetic Industry, 66:4, April 1950, p. 460.

Orlando Morning Sentinel, vol. XXIV, No. 32322, Orlando, Fla., Nov. 5, 1951, pp. 1 and 2.

Marruzella et al.: J.A.P.A. Sci. Ed., vol. XLV, No. 6, June 1956, pp. 378–381.

Schimmel: Briefs, No. 153, December 1947, 1 p.

Kellner: Chem. Abst., vol. 49, August–September 1955, p. 11091f.

Ishidate et al.: Chem. Abst., vol. 44, April–June 1950, cols. 4201–4202.

Johnson: Chem. Abst., vol. 39, May–August 1945, cols. 2001–2002.

Greenberg: Handbook of Cosmetic Materials, Interscience Publishers, Inc., N.Y. (1954), pp. 279–280.

Kittleson: Science, vol. 115, Jan. 25, 1952, pp. 84–86.

Broch: D. and C. Industry, 69:6, December 1951, p. 813.